United States Patent [19]

Yamauchi et al.

[11] Patent Number: 5,258,905
[45] Date of Patent: Nov. 2, 1993

[54] EXPANDED PROGRAMMABLE MACHINE CONTROLLER

[75] Inventors: Takashi Yamauchi, Minamitsuru; deceased, Akira Sakagami, late of Kagoshima, by Naomi Sakagami, legal representative; Atsushi Koike, Minamitsuru, all of Japan

[73] Assignee: Fanuc Ltd, Yamanashi, Japan

[21] Appl. No.: 768,863

[22] PCT Filed: Jan. 31, 1991

[86] PCT No.: PCT/JP91/00124
§ 371 Date: Sep. 27, 1991
§ 102(e) Date: Sep. 27, 1991

[87] PCT Pub. No.: WO91/11759
PCT Pub. Date: Aug. 8, 1991

[30] Foreign Application Priority Data

Feb. 2, 1990 [JP] Japan .................................. 2-23942

[51] Int. Cl.$^5$ .............................................. G05B 19/05
[52] U.S. Cl. ................................ 364/147; 364/474.01; 364/474.23
[58] Field of Search ............... 364/474.11, 147, 191, 364/192, 474.23, 474.01; 395/275

[56] References Cited

U.S. PATENT DOCUMENTS

| 4,722,043 | 1/1988 | Nagamine et al. | 364/147 |
| 4,882,670 | 1/1989 | Isobe et al. | 364/188 |
| 4,887,220 | 12/1989 | Kiya et al. | 364/474.11 |
| 4,954,980 | 9/1990 | Yamauchi | 395/275 |

FOREIGN PATENT DOCUMENTS

| 0407612 | 1/1991 | European Pat. Off. . |
| 58-178408A | 10/1983 | Japan . |
| 59-114603 | 7/1984 | Japan . |
| 60-63603A | 4/1985 | Japan . |
| 63-12001 | 1/1988 | Japan . |
| 64-10305 | 1/1989 | Japan . |
| 1-142801 | 6/1989 | Japan . |
| 2-202604 | 8/1990 | Japan . |

Primary Examiner—Jerry Smith
Assistant Examiner—Paul Gordon
Attorney, Agent, or Firm—Staas & Halsey

[57] ABSTRACT

An expanded programmable memory controller (PMC) is provided outside a numerical control device and connected to a main body programmable machine controller (PMC) which is inside the numerical control apparatus. The expanded programmable machine controller has a first sequence program, a second sequence program and a switching control mechanism. The first sequence program controls equipment connected to the expanded PMC. The second sequence program pseudo-executes an operation performed by the main body PMC. The switching control mechanism performs switching operation when an I/O signal of the first sequence program is supplied to or received from the main body PMC and when the I/O signal of the first sequence program is supplied to or received from the second sequence program so that when supplied to or received from the second sequence program, the first sequence and the second sequence programs are alternatively executed.

3 Claims, 6 Drawing Sheets

EXPANDED PROGRAMMABLE MACHINE CONTROLLER

BACKGROUND OF THE INVENTION

1. Field of the Invention

The present invention relates to an expanded programmable machine controller connected to a main body programmable machine controller (PMC) inside a numerical control apparatus, and more specifically, to an expanded programmable machine controller which can independently carry out a debugging, operations and the like while not connected to the main body PMC.

2. Description of the Related Art

A numerical control apparatus contains a programmable controller (PC) for controlling the mechanical units or devices of a machine tool, and the PC contained in the numerical control apparatus is referred to as a programmable machine controller (PMC).

When a machine tool is complex, and units such as a pallet changer and the like are added to, for example, a machining center, the PMC in the numerical control apparatus must contain a sequence program and the like having a larger capacity and be able to carry out a processing at a higher speed to control these units.

Further, when these mechanical units are selected as necessary, to constitute the machining center or the like, and the type of the units is increased, the pallet changer, for example, must be able to select the number of pallets required, and to satisfy such a requirement, it is necessary to modify the sequence program or the number of the I/O circuits and the like of the PMC contained in the numerical control apparatus.

Nevertheless, it is very time-consuming to create or modify a sequence program for each arrangement of machine tools, and further, the development, debugging and the like of the sequence programs also take a very long time.

To cope with this requirement, an expanded PMC (programmable machine controller) is employed and used for each mechanical unit to be controlled. The expanded PMC is disposed outside of a numerical control apparatus and controls only, for example, a mechanical unit such as a pallet changer and the like, and thus a machine tool not provided with a pallet changer need not include the expanded PMC. Note, in contrast to the expanded PMC, a PMC disposed inside of a numerical control apparatus is referred to as a main body PMC. Japanese Patent Application No. Hei 1-23505 filed by the applicant discloses an example of such an expanded PMC.

Nevertheless, when the main body PMC is connected to the expanded PMC to form an entire system, conventionally the debugging of a system program for operating the system cannot be carried out unless the entire system has been completed. Therefore, to carry out the debugging of the expanded PMC, the main body PMC is also needed, and further, the debugging of the sequence program of the main body PMC must have been completed. If, however, the sequence program of the expanded PMC and the sequence program of the main body PMC can be independently developed, during the development of an actual machine tool, the period needed for developing a program can be shortened. Conversely, sometimes there is a need to debug the sequence program of a main body PMC after the sequence program of an expanded PMC has been completed. In general, a preferable developing process is that whereby the sequence program of a main body PMC serving as a central PMC is debugged after the respective units have been debugged.

SUMMARY OF THE INVENTION

Taking the above into consideration, an object of the present invention is to provide an expanded PMC which can independently carry out a debugging while not connected to a main body PMC.

To attain the above object, according to the present invention, there is provided an expanded programmable machine controller (PMC) connected to the main body programmable machine controller (PMC) inside the numerical control apparatus and disposed outside of the numerical control apparatus, which comprises a first sequence program for controlling the equipment controlled by the expanded PMC, a second sequence program for a pseudo execution of the operation of the main body PMC, and a switching control means for carrying out a switching when the I/O signal of the first sequence program is supplied to or received from the main body PMC, and when the I/O signal of the first sequence program is supplied to or received from the second sequence program, and when connected to the second sequence program, alternately executing the first sequence program and the second sequence program.

When the main body PMC is not formed, the debugging or operations must be carried out by only the expanded PMC, and thus the second ladder program for executing the function of the main body PMC is pseudo-executed. More specifically, the second sequence program supplies an input/output signal to the first sequence program and receives same therefrom in place of the main body PMC, and operates as if the main body PMC existed when viewed from the first sequence program. More specifically, the first sequence program and the second sequence program are alternately executed to enable the expanded PMC to independently operate, and thus the sequence program can be debugged only by the expanded PMC.

When the main body PMC has been formed, the second sequence program is not needed, and thus only the first sequence program is executed.

DETAILED DESCRIPTION OF THE PREFERRED EMBODIMENT

An embodiment of the present invention will be described below with reference to the drawings.

Figure 1:
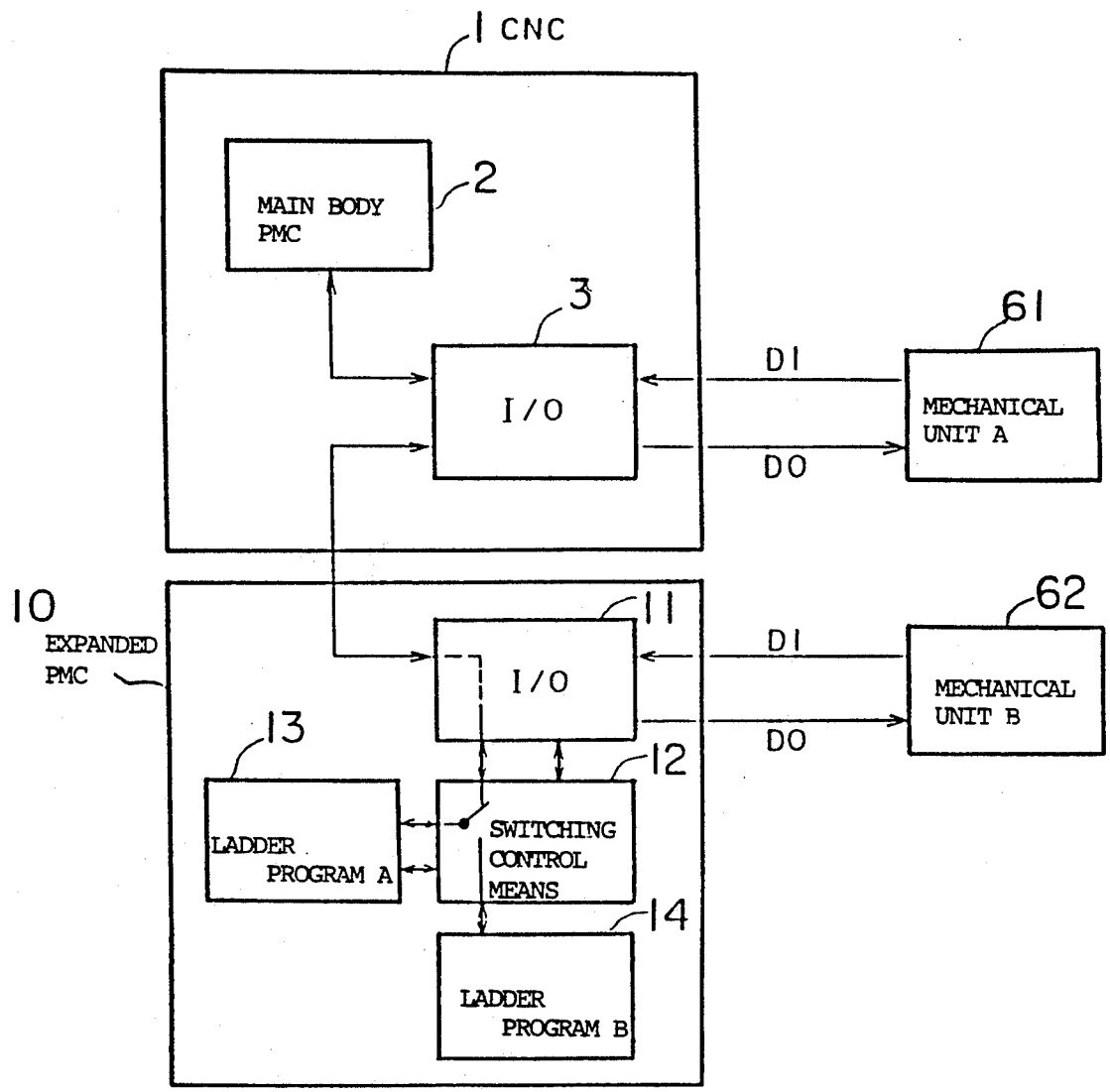
FIG. 1 is a block diagram of an expanded PMC of an embodiment according to the present invention.

FIG. 1 is a block diagram of an expanded PMC of an embodiment according to the present invention. A numerical control apparatus (CNC) 1 is provided with a main body PMC (programmable machine controller) 2, which controls a mechanical unit A 61 through an input/output circuit (I/O) 3. The mechanical unit A 61 may be a basic mechanical unit such as a tool exchanger or a machine tool, e.g., a machining center controlled by the CNC 1.

An expanded PMC 10 is connected to the I/O 3, and an input/output circuit (I/O) 11 is connected to the I/O 3 to enable a signal to be exchanged between the main body PMC 2 and the expanded PMC 10. The expanded PMC 10 controls an additional mechanical unit B 62, which is, for example, a mechanical unit such as a pallet changer or the like of the machining center. It can be determined whether or not the mechanical unit is provided, and further the number of pallets, etc. can be selected. Therefore, when the mechanical unit B 62 such as the pallet changer, etc. is not added, the expanded PMC 10 is not needed.

The mechanical unit B 62 is controlled by a ladder program A 13. More specifically, a signal from the limit switch or the like of the mechanical unit B 62 is received through the I/O 11 and processed by the ladder program A 13 to drive the hydraulic, pneumatic, or magnetic actuators or the like of the mechanical unit B 62 for control of same. Although not shown, the mechanical unit B 62 includes a drive circuit which receives an output signal from the I/O 11 and drives these hydraulic, pneumatic, or magnetic actuators accordingly. In this example, the explanation is based on the use of a ladder program, created by a ladder type, as the sequence program.

Further, a command from the CNC 1 is supplied from the main body PMC 2 to the ladder program A 13 through the I/O 3 and I/O 11, and supplied from the I/O 11 to the mechanical unit B after having been subjected to a necessary processing. The command includes, for example, a selection command signal or the like for selecting a pallet changer. Conversely, a fault signal and the like of the mechanical unit A 13 is read by the ladder program A 13 through the I/O 11 and supplied to the main body PMC 2 through the I/Os 11 and 3.

Nevertheless, this exchange of signals between the ladder program A 13 and the main body PMC 2 is limited to the case wherein the ladder program of the main body PMC 2 has been completed and the CNC 1 exists. In an actual development process, however, sometimes there is a need to test the mechanical unit B 62 before the CNC 1 or the ladder program of the main body PMC 2 has been completed. Further, it is generally desirable that the mechanical unit B 62 be first completed and the ladder program A 13 debugged, i.e., peripheral units completed, and then an overall test carried out by making the necessary connections to the CNC 1.

Therefore, it is necessary to create and debug the ladder program A 13, and to adjust the mechanical unit B 62 and the like, by using only the expanded PMC 10 and mechanical unit B 62 without using the CNC 1, and to achieve this object, a ladder program B 14 is provided and connected to the ladder program A 13, to exchange signals with the main body PMC 2.

More specifically, the ladder program B 14 executes the exchange of an I/O signal with the ladder program A 13 originally executed by the main body PMC 2. Of course, the ladder program B 14 does not need to execute all of the functions of the main body PMC 2, but only the exchange of the I/O signal with the ladder program A 13, and further, the exchange of the I/O signal need not be always executed at the same time as that of the main body PMC 2, and may be executed by using keyboard or the like (not shown) of the CNC 1.

For this purpose, a switching control means 12 is provided and when only the expanded PMC 10 is operated, i.e., in a test mode, the ladder program A 13 is connected to the ladder program B14 to enable the mechanical unit B 62 to be controlled by the ladder program A 13 without using the CNC 1. Of course, when the main body PMC 10 is connected to the CNC 1 and operated, the switching control means 12 connects the ladder program A 13 to the I/O 11. Further, the ladder program A 13 is connected to the mechanical unit B 62 regardless of the operation of the switching control means 12.

Figure 2:
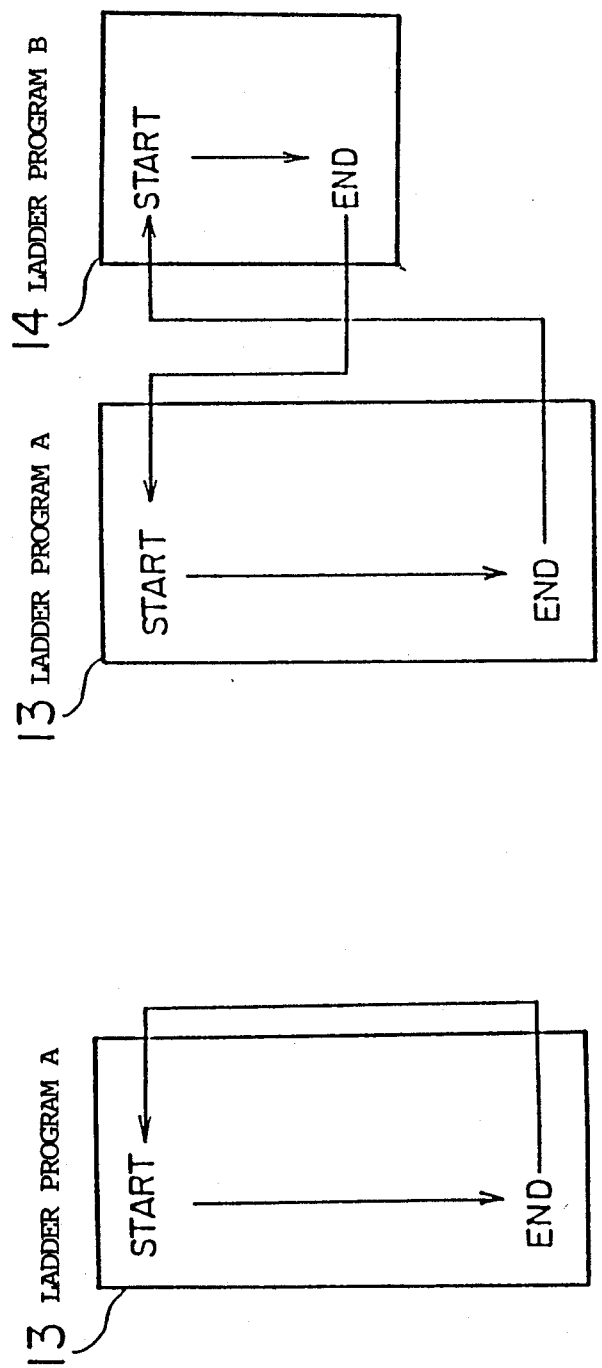
FIGS. 2(a) and (b) are diagrams showing the processing of a ladder program.

FIGS. 2(a) and 2(b) are diagrams showing the processing of a ladder program. As shown in FIG. 2(a), when the expanded PMC 10 is connected to the main body PMC 2 (normal mode), only the ladder program A 13 is repeatedly executed in the expanded PMC 10.

Further, when the expanded PMC 10 is isolated from the CNC 1 and independently operated (test mode), the ladder program A 13 is executed for one cycle and then the ladder program B 14 is executed for one cycle, and these operations are repeated, as shown in FIG. 2(b). The ladder program B 14 prepares an I/O signal needed by the ladder program A 13.

Figure 3:
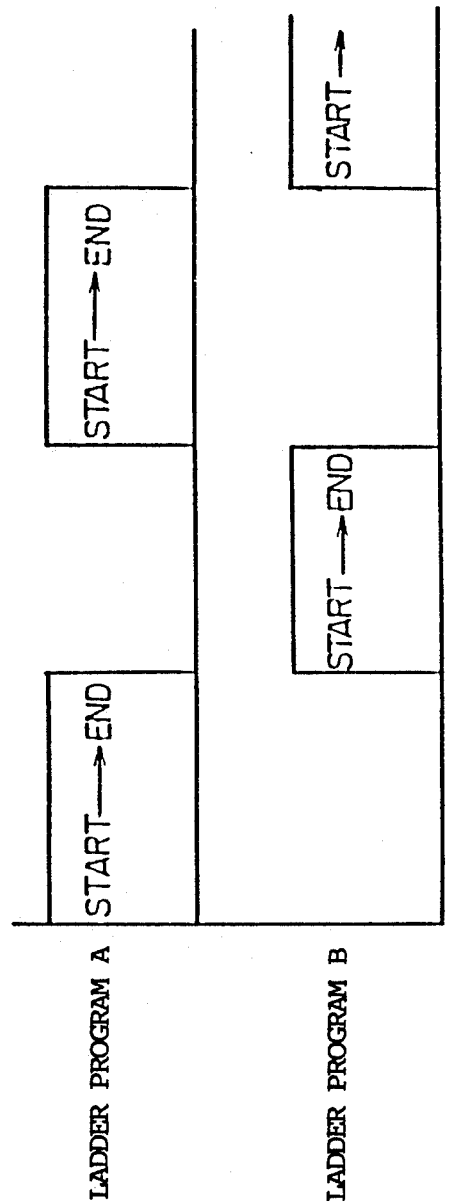
FIG. 3 is a time chart showing the execution of a ladder program in a test mode.

FIG. 3 is a time chart showing the execution of a ladder program in a test mode. As shown in the figure, the ladder program A 13 and the ladder program B 14 are alternately executed. The ladder program B 13 pseudo-executes the operation executed by the main body PMC 2 when it is connected to the main body PMC 2 (in a normal mode).

Figure 4:
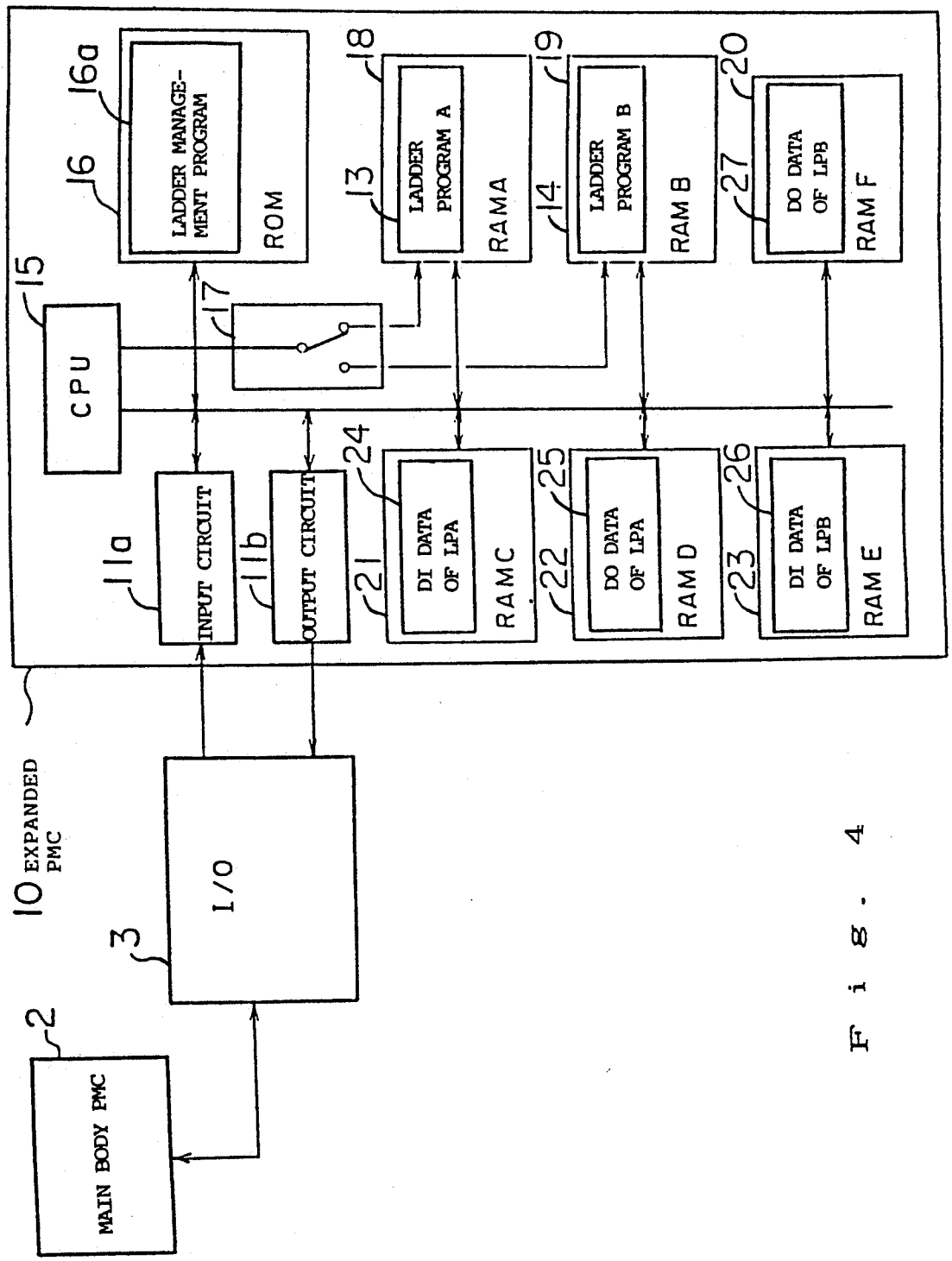
FIG. 4 is a detailed block diagram of an expanded PMC.

FIG. 4 is a block diagram of hardware of the expanded PMC, wherein, the main body PMC 2 is connected to the expanded PMC 10 through the I/O 3. The expanded PMC 10 is arranged to use a processor 15 as the central part thereof, and the processor 15 controls the expanded PMC 10 by the ladder management program 16a stored in a ROM 16.

When the main body PMC 2 is connected to the expanded PMC 10 (normal mode), a bank switching circuit 17 is connected to the right side as shown in the figure, and thus only the ladder program A 13 is executed. A command signal and the like from the main body PMC 2 are supplied to an input circuit 11a through the I/O 3 and stored in a RAM C 21 as the DI data 24 of the ladder program A 13 (LPA), and further, as a signal to the main body PMC 2, the DO data 25 of the ladder program A (LPA) 13 is supplied from a RAM D 22 to the main body PMC 2 through an output circuit 11b and the I/O 3. More specifically, the input signal of the ladder program A 13 is the DI data 24 of the RAM C 21. This input data is read and subjected to a necessary processing, and an output signal is written into the RAM D 22 as the DO data 25 and supplied to the main body PMC 2 through the output circuit 11b and I/O 3. Note that the ladder program A 13 is stored in a RAM A 18.

Next, when the expanded PMC 10 is independently operated (test mode), first the bank switching circuit 17 is connected to the right side to execute the ladder program A 13, and then the bank switching circuit 17 is switched to the left side to execute the ladder program B 14, and these operations are repeated. Note that the ladder program B 14 is stored in a RAM B 19.

Since an I/O signal of the ladder program A 13 is isolated from the main body PMC 2 in the test mode, it is supplied from the ladder program B 14. The DO data 27 of the ladder program B (LPB) 14 stored in the RAM F 20 is supplied to the RAM C 21 and serves as the DI data 24 of the ladder program A 13, whereas the DO data 25 of the ladder program A 13 is supplied to a RAM E 23 and serves as the DI data 26 of the ladder program B 14. The DI data 26 is processed by the ladder program B 14, and the processing is carried out in the same manner as that of the main body PMC 2.

Figure 5:
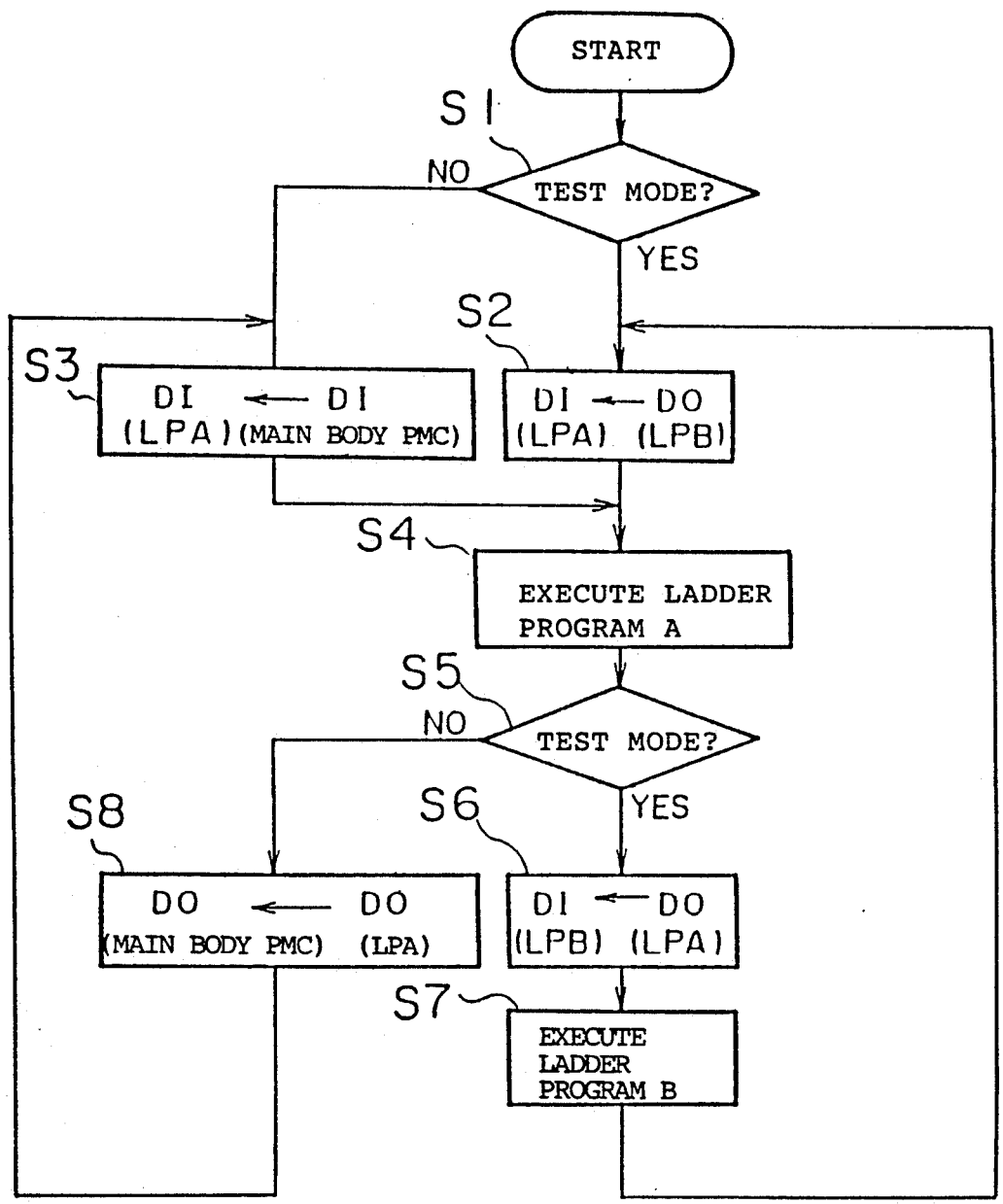
FIG. 5 is a flowchart of an embodiment of the present invention.

FIG. 5 is a flowchart of an embodiment of the present invention, wherein numerals prefixed with an "S" indicate the numbers of steps of the process.

In step S1, it is determined whether an operation is carried out in a test mode in which the expanded PMC 10 is independently operated; when executed in the test mode, the flow goes to step S2, and when executed in a normal mode, the flow goes to step S3.

In step S2, since the operation is carried out in the test mode, the DO data 27 of the ladder program B (LPB) 14 in the RAM F 20 is supplied to the RAM C 21. This DO data 27 serves as the DI data 24 of the ladder program A 13.

In step S3, since the operation is carried out in the normal mode, the DI from the main body PMC 2 is read from the input circuit 11a and written into the RAM C 21 to serve as the DI data 24 of the ladder program A (LPA) 13.

In step S4, the DI data 24 is read and the ladder program A 13 is executed, and the output signal obtained as the result of the execution is written into the RAM D 22 as the DO data 25 of the ladder program A (LPA) 13.

In step S5, it is determined whether an operation is carried out in the test mode: when executed in the test mode, the flow goes to step S6 and when not executed in the test mode (normal mode), the flow goes to step S8.

In step S6, since the operation is carried out in the test mode, the DO data 25 of the ladder program (LPA) 13 in the RAM D 22 is supplied to the RAM E 23 and this data serves as the DI data 26 of the ladder program B (LPB) 14.

In step S7, the ladder program B 14 is executed, and at this time, the DI data 26 is read and subjected to a necessary processing and the DO data 27 is written into the RAM F 20.

In step S8, since the operation is carried out in the normal mode, the DO data 25 of the LPA in the RAM D 22 is output to the main body PMC 2 as the DO data, through the output circuit 11b, and the flow returns to step S3.

The above processing is carried out by the processor 15 in accordance with the ladder management program 16a.

As described above, when the operation is carried out in the normal mode, the ladder program A 13 is executed while a signal is supplied to and received from the main body PMC 2. Further, when the expanded PMC 10 is independently operated, i.e., when the operation is carried out in the test mode, a processing is carried out while the ladder program A 13 and ladder program B 14 are alternately executed.

Figure 6:
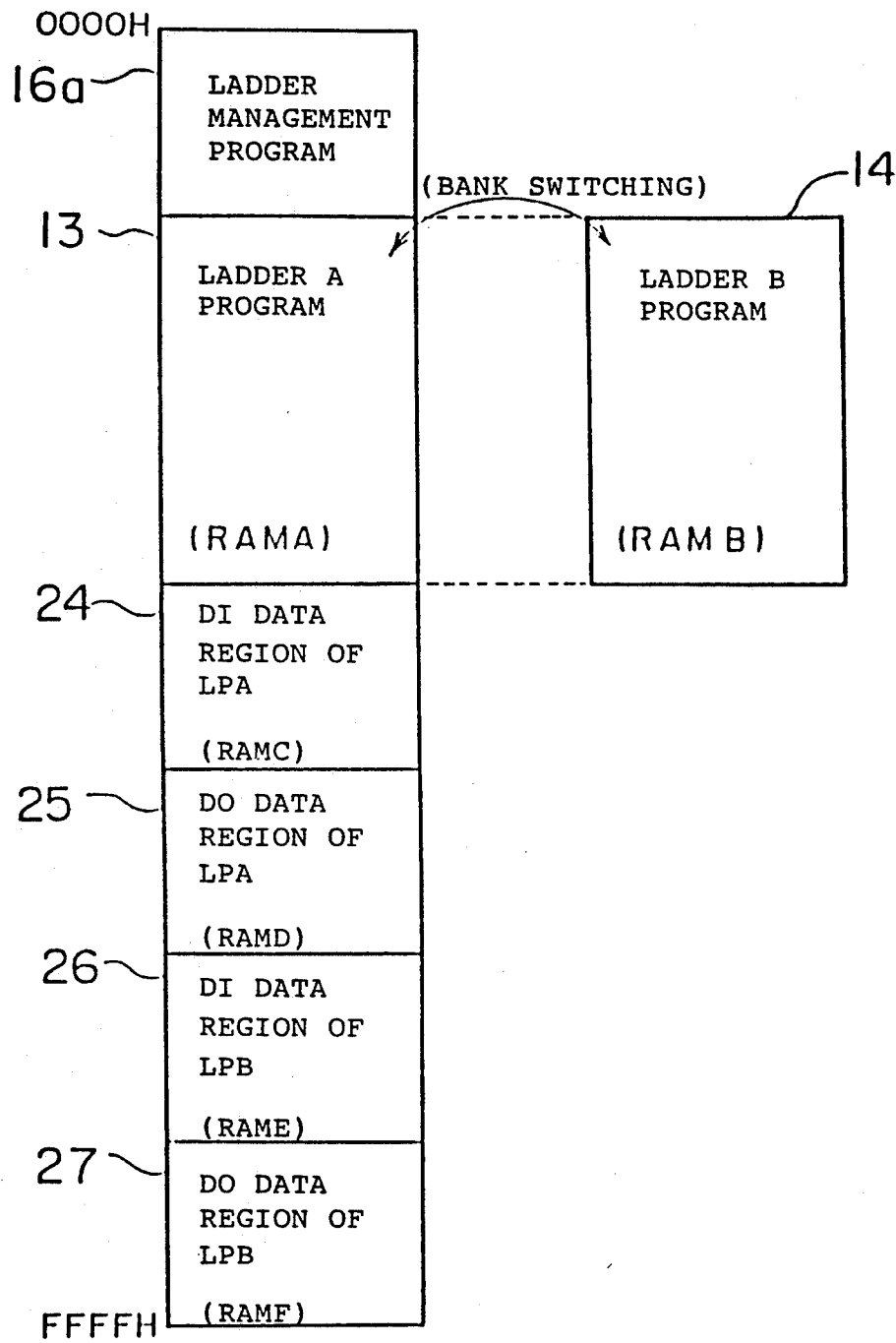
FIG. 6 is a memory map of a ladder program and an I/O data.

FIG. 6 is a memory map of a ladder program and an I/O data. A memory region ranges from an address 0000H to an address FFFFH. First, the region for the ladder management program 16a is set and then the ladder programs A 13 and B 14 are disposed at the same memory address and switched by the bank switching circuit 17. Next, the DI data 24 of the ladder program A (LPA) 13, the DO data 25 of the ladder program A (LPA) 13, the DI data 26 of the ladder program B (LPB) 14, and the DO data 27 of the ladder program B (LPB) 14 are disposed, in this order.

Although the ladder program is used as the sequence program in the above description, another type of sequence program using, e.g., a language such as PASCAL and the like, may be applied in the same manner.

Further, although the main body PMC is connected to the expanded PMC by using the input/output circuit (I/O), a bus connection, serial transfer circuit or the like may be used.

As described above, according to the present invention, since the switching control means and the sequence program for operating the main body PMC are provided, debugging can be carried out by only the expanded PMC, and thus operations such as the development of sequence programs and the adjustment of mechanical units can be separately carried out.

Further, the process for debugging the entire system can be effectively carried out in such a manner that the sequence program of the main body PMC for controlling each expanded PMC is debugged after the sequence program of each expanded PMC has been created and debugged and the mechanical units have been adjusted, whereby the development process as a whole can be shortened.

Although the invention has been described with reference to a specific embodiment, it is not meant to be construed as limited thereto. Various other embodiments and/or modifications of the invention will become readily apparent to persons skilled in the art without departing from the true scope and spirit of the invention as defined by the appended claims.

What is claimed is:

1. An expanded programmable machine controller (PMC) provided outside of a numerical control apparatus and connected to a main body programmable machine controller (PMC) which is inside the numerical control apparatus, comprising:

a first sequence program for controlling equipment connected to the expanded PMC;

a second sequence program for pseudo-execution of an operation performed by said main body PMC; and switching control means for carrying out a switching when an I/O signal of said first sequence program is supplied to or received from said main body PMC and when the I/O signal of said first sequence program is supplied to or received from said second sequence program so that when supplied to or received from said second sequence program, said first sequence program and said second sequence program are alternately executed.

2. An expanded PMC according to claim 1, wherein said main body PMC is connected to said expanded PMC by connecting a first input/output circuit which is connected to said main body PMC to a second input/output circuit which is connected to said switching control means.

3. An expanded PMC according to claim 1, wherein said first and second sequence programs are arranged by a ladder program created by a ladder type.

* * * * *

UNITED STATES PATENT AND TRADEMARK OFFICE
CERTIFICATE OF CORRECTION

PATENT NO. : 5,258,905
DATED : November 2, 1993
INVENTOR(S) : Takashi Yamauchi et al It is certified that error appears in the above-indentified patent and that said Letters Patent is hereby corrected as shown below:

Column 3, line 39, change "A 13" to --B 62--.
Column 3, line 39, change "A13" to --A 13--.

Signed and Sealed this

First Day of November, 1994

Attest:

BRUCE LEHMAN

Attesting Officer     Commissioner of Patents and Trademarks